US011516671B2

(12) United States Patent
Rajput et al.

(10) Patent No.: US 11,516,671 B2
(45) Date of Patent: Nov. 29, 2022

(54) METHODS, SYSTEMS, AND COMPUTER READABLE MEDIA FOR MITIGATING LOCATION TRACKING AND DENIAL OF SERVICE (DOS) ATTACKS THAT UTILIZE ACCESS AND MOBILITY MANAGEMENT FUNCTION (AMF) LOCATION SERVICE

(71) Applicant: Oracle International Corporation, Redwood Shores, CA (US)

(72) Inventors: Jay Rajput, Bangalore (IN); Shashikiran Bhalachandra Mahalank, Bangalore (IN); Venkata Srivatsa Grandhi, Hyderabad (IN); Prateek Wadhwa, Hisar (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/185,934

(22) Filed: Feb. 25, 2021

(65) Prior Publication Data

US 2022/0272541 A1 Aug. 25, 2022

(51) Int. Cl.
*H04W 12/12* (2021.01)
*H04W 8/18* (2009.01)
(Continued)

(52) U.S. Cl.
CPC ....... *H04W 12/122* (2021.01); *H04L 63/0281* (2013.01); *H04L 63/1458* (2013.01);
(Continued)

(58) Field of Classification Search
CPC ....... H04W 12/122; H04W 8/02; H04W 8/18; H04W 12/06; H04W 64/00;
(Continued)

(56) References Cited

U.S. PATENT DOCUMENTS 6,091,958 A 7/2000 Bergkvist et al.
6,151,503 A 11/2000 Chavez
(Continued)

FOREIGN PATENT DOCUMENTS

CN 101277541 A 10/2008
CN 10135561 A 1/2009
(Continued)

OTHER PUBLICATIONS

Communication of European publication number and information on the application of Article 67(3) EPC for European Patent Application Serial No. 19730571.7 (dated Apr. 8, 2021).
(Continued)

*Primary Examiner* — Khawar Iqbal
(74) *Attorney, Agent, or Firm* — Jenkins, Wilson, Taylor & Hunt, P.A.

(57) ABSTRACT

A method for mitigating location tracking and DoS attacks that utilize an AMF location service includes receiving, at an NF, an authentication response message from an HPLMN of a UE. The method further includes extracting, by the NF and from the authentication response message, a subscription identifier and an indicator of an authentication result for the UE. The method further includes storing, by the NF and in an AMF location service validation database, the subscription identifier and the indicator of the authentication result for the UE. The method further includes receiving, by the NF, an AMF location service message and using at least one of a subscription identifier extracted from the AMF location service message and contents of the AMF location service validation database, to classify the AMF location service message as a location tracking or DoS attack. The method further includes preventing the location tracking or DoS attack.

16 Claims, 8 Drawing Sheets

(51) Int. Cl.
  *H04W 12/122*  (2021.01)
  *H04W 8/02*  (2009.01)
  *H04W 64/00*  (2009.01)
  *H04W 12/06*  (2021.01)
  *H04L 9/40*  (2022.01)
  *H04W 84/04*  (2009.01)

(52) U.S. Cl.
  CPC ............... *H04W 8/02* (2013.01); *H04W 8/18* (2013.01); *H04W 12/06* (2013.01); *H04W 64/00* (2013.01); *H04L 2463/142* (2013.01); *H04W 84/042* (2013.01)

(58) Field of Classification Search
  CPC ............. H04W 84/042; H04L 63/0281; H04L 63/1458; H04L 2463/142
  See application file for complete search history.

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,652,850 B2 | 5/2020 | Landais et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,984,128 B1 | 4/2021 | Hoffer |
| 11,050,788 B2 * | 6/2021 | Livanos ................ H04W 48/16 |
| 11,368,839 B2 * | 6/2022 | Targali .................. H04W 12/72 |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0094060 A1 | 4/2015 | Kouridakis et al. |
| 2015/0121078 A1 | 4/2015 | Fu et al. |
| 2015/0188979 A1 | 7/2015 | Almeras et al. |
| 2015/0304220 A1 | 10/2015 | Miyao |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183178 A1 | 6/2016 | Marimuthu |
| 2016/0219043 A1 | 7/2016 | Blanke |
| 2016/0269566 A1 | 9/2016 | Gundamaraju et al. |
| 2016/0292687 A1 | 10/2016 | Kruglick |
| 2016/0365983 A1 | 12/2016 | Shahabuddin et al. |
| 2016/0381699 A1 | 12/2016 | Rubin et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |

(56) References Cited

U.S. PATENT DOCUMENTS

| | | |
|---|---|---|
| 2017/0295201 A1 | 10/2017 | Peylo et al. |
| 2017/0345006 A1 | 11/2017 | Kohli |
| 2018/0020324 A1 | 1/2018 | Beauford |
| 2018/0109632 A1 | 4/2018 | Stammers et al. |
| 2018/0109953 A1 | 4/2018 | He |
| 2018/0167906 A1 | 6/2018 | Chellamani et al. |
| 2018/0205698 A1 | 7/2018 | Gupta et al. |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2020/0007538 A1 | 1/2020 | Mehta |
| 2020/0036754 A1* | 1/2020 | Livanos ............... H04W 48/16 |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2021/0022070 A1 | 1/2021 | Letor et al. |
| 2021/0111985 A1 | 4/2021 | Mahalank et al. |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1* | 7/2021 | Jost ...................... H04W 12/02 |
| 2021/0234706 A1 | 7/2021 | Nair et al. |
| 2021/0243165 A1* | 8/2021 | Bykampadi ............ H04L 67/02 |
| 2021/0250186 A1 | 8/2021 | Bykampadi et al. |
| 2021/0297942 A1 | 9/2021 | Bykampadi et al. |
| 2021/0321303 A1* | 10/2021 | Nair ........................ H04L 12/14 |
| 2021/0377138 A1* | 12/2021 | Sun .......................... H04L 43/06 |
| 2021/0377212 A1 | 12/2021 | Holtmanns et al. |
| 2021/0399988 A1 | 12/2021 | Labonte |
| 2021/0406038 A1 | 12/2021 | Fetzer et al. |
| 2022/0022027 A1 | 1/2022 | Xin et al. |
| 2022/0022040 A1 | 1/2022 | Mahalank et al. |
| 2022/0030413 A1* | 1/2022 | Ben Henda ............. H04W 8/02 |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124479 A1 | 4/2022 | Iddya |
| 2022/0124501 A1* | 4/2022 | S Bykampadi ..... H04W 12/088 |
| 2022/0150212 A1 | 5/2022 | Rajput |
| 2022/0158847 A1* | 5/2022 | Aggarwal ............. H04L 9/3247 |
| 2022/0159445 A1 | 5/2022 | Rajavelu |
| 2022/0174544 A1* | 6/2022 | Taft ....................... H04W 28/10 |
| 2022/0191694 A1 | 6/2022 | Rajput |
| 2022/0200951 A1* | 6/2022 | Goel ...................... H04L 61/10 |
| 2022/0200966 A1* | 6/2022 | de-Gregorio-Rodriguez .............. H04L 63/0807 |
| 2022/0201489 A1 | 6/2022 | Mahalank |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 110035433 A | 7/2019 |
| CN | 110800322 B | 5/2021 |
| CN | Z L201880040478.3 | 4/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| ES | 2 548 005 T3 | 10/2015 |
| JP | 7038148 B2 | 3/2022 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |

OTHER PUBLICATIONS

International Search Report for International Patent Application Serial No. PCT/US2020/065763 (dated Apr. 6, 2021).

First Examination Report for Indian Patent Application Serial No. 201947047367 (dated Mar. 31, 2021).

Notice of Allowance for Chinese Patent Application Serial No. 201880040477.9 (dated Mar. 29, 2021).

Communication under Rule 71(3) EPC Intention to Grant for European Patent Application Serial No. 18 731 923.1 (dated Mar. 22, 2021).

First Examination Report for Indian Patent Application Serial No. 201947047012 (dated Mar. 18, 2021).

"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).

"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).

"3rd Generation Partnership Project; Technical Specification Group Core Network and Terminals; Numbering, addressing and identification; (Release 17)," 3GPP TS 23.003, V17.0.0, pp. 1-142 (Dec. 2020).

"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).

(56) References Cited

OTHER PUBLICATIONS

"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
DeKok, "The Network Access Identifier," Internet Engineering Task Force (IETF), RFC 7542, pp. 1-30 (May 2015).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
Fajardo, V. et al., "Diameter Base Protocol, Internet Engineering Task Force (IETF)," RFC 6733, pp. 1-152 (Oct. 2012).
Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-assigned, co-pending U.S. Appl. No. 17/099,683 for "Methods, Systems, and Computer Readable Media for Validating Location Update Messages," (Unpublished, filed Nov. 16, 2020).
Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).
SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.
Notice of Allowance and Fee(s) Due and Examiner-Initiated Interview Summary for U.S. Appl. No. 16/379,488 (dated Oct. 23, 2020).
Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).

(56) References Cited

OTHER PUBLICATIONS

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

Non-Final Office Action for U.S. Appl. No. 16/024,422 (dated Jul. 8, 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18756018.0 (dated May 13, 2020).

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V. 16.1.0, pp. 1-17 (Dec. 2019).

3rd Generation Partnership Project; Technical Specification Group Core Network and Terminals; T8 reference point for Northbound APIs, (Release 15), 3GPP TS 29.122, V15.6.0, pp. 1-300 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non-Final Office Action for U.S. Appl. No. 15/666,300 (dated Jun. 27, 2019).

Decision on Appeal for U.S. Appl. No. 13/047,287 (dated Jun. 18, 2019).

Notification of Transmittal of the International Search Report and the Written Opinion of the International Searching Authority, or the Declaration for International Patent Application No. PCT/US2019/018990 (dated May 8, 2019).

Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (filed Apr. 9, 2019).

Non-Final Office Action for U.S. Appl. No. 16/100,172 (dated Apr. 11, 2019).

Notice of Allowability for U.S. Appl. No. 16/035,008 (dated Mar. 18, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (filed Aug. 9, 2018).

Final Office Action for U.S. Appl. No. 15/408,155 (dated Jul. 26, 2018).

Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (filed Jul. 13, 2018).

Commonly-assigned, co-pending U.S. Appl. No. 16/024,422 for "Methods, Systems, and Computer Readable Media for Network Node Validation," filed Jun. 29, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

"Signalling Security in Telecom SS7/Diameter/5G," Enisa, pp. 1-30 (Mar. 2018).

(56) References Cited

OTHER PUBLICATIONS

Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Commonly-assigned, co-pending U.S. Appl. No. 15/636,118 for "Methods, Systems, and Computer Readable Media for Validating User Equipment (UE) Location," (filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
Commonly-assigned, co-pending U.S. Appl. No. 15/408,155 for "Methods, Systems, and Computer Readable Media for Validating a Redirect Address in a Diameter Message," (filed Jan. 17, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).

Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
Croft, N., "On Forensics: A Silent SMS Attack," Information and Computer Security Architectures (ICSA) Research Group, Department of Computer Science, pp. 1-4, University of Pretoria, South Africa (2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).

(56) References Cited

OTHER PUBLICATIONS

"Solution: Itron Centron GPRS," Data Sheet, http://www.smartsynch.com/SmartSynch_itron_centron.htm, pp. 1-3 (Downloaded from the Internet on Jul. 5, 2011).
Commonly-assigned, co-pending U.S. Appl. No. 13/047,287 (filed Mar. 14, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Dierks et al., "The Transport Layer Security (TLS) Protocol Version 1.2," RFC 5246, pp. 1-208 (Aug. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Housley et al., "Internet X.509 Public Key Infrastructure Certificate and Certificate Revocation List (CRL) Profile," RFC 3280, pp. 1-258 (Apr. 2002).
Non-Final Office Action for U.S. Appl. No. 17/009,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71(3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Intention to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

(56) References Cited

OTHER PUBLICATIONS

Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (dated Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"5G; Procedures for the 5G System (3GPP TS 23.502 version 15.3.0 Release 15)," ETSI TS 123 502, V15.3.0, pp. 1-330 (Sep. 2018).
"N32 message anti-spoofing within the SEPP," 3GPP TSG SA WG3 (Security), Meeting #91, pp. 1-2 (Apr. 16-20, 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).

\* cited by examiner

METHODS, SYSTEMS, AND COMPUTER
READABLE MEDIA FOR MITIGATING
LOCATION TRACKING AND DENIAL OF
SERVICE (DOS) ATTACKS THAT UTILIZE
ACCESS AND MOBILITY MANAGEMENT
FUNCTION (AMF) LOCATION SERVICE

TECHNICAL FIELD

The subject matter described herein relates to network security. More particularly, the subject matter described herein relates to methods, systems, and computer readable media for mitigating location tracking and DoS attacks that utilize an AMF location service.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that unauthorized entities can use the AMF location service to obtain location information regarding a subscriber. 3GPP TS 29.518 defines the Namf_Location service, which allows NFs to request or subscribe to receive geographic location and positioning information of a target UE. The Namf_Location service is typically used by entities in the UE's home network, such as the gateway mobile location center (GMLC) and the user data management (UDM), to determine the current location of the UE. However, one problem with the Namf_Location service is that there is no resource object level authorization for this service. Accordingly, unauthorized entities, including entities outside of the UE's home network, can use the Namf_Location service to obtain the UE's location without authorization. Such unauthorized use of the Namf_Location service is referred to herein as a location tracking attack. Similarly, unauthorized entities outside of a UE's home network can also use the Namf_Location service to overwhelm the AMF with unauthorized location service request messages. This type of attack is referred to as a denial of service (DoS) attack.

As providing the location of a UE without authorization is undesirable, there exists a need for methods, systems, and computer readable media for mitigating location tracking and DoS attacks that utilize an AMF location service.

SUMMARY

A method for mitigating location tracking and DoS attacks that utilize an AMF location service includes receiving, at a network function (NF), an authentication response message from a home public land mobile network (HPLMN) of a user equipment (UE). The method further includes extracting, by the NF and from the authentication response message, a subscription identifier and an indicator of an authentication result for the UE. The method further includes storing, by the NF and in an AMF location service validation database, the subscription identifier and the indicator of the authentication result for the UE. The method further includes receiving, by the NF, an AMF location service message. The method further includes using, by the NF, at least one of a subscription identifier extracted from the AMF location service message and contents of the AMF location service validation database, to classify the AMF location service message as a location tracking or DoS attack. The method further includes, in response to classifying the AMF location service message as a location tracking attack, preventing the location tracking or DoS attack.

According to another aspect of the subject matter described herein, the NF comprises a security edge protection proxy (SEPP).

According to yet another aspect of the subject matter described herein, the SEPP comprises a visited SEPP of the UE.

According to yet another aspect of the subject matter described herein, receiving an authentication response message includes receiving an Nausf_UEAuthentication message containing an authentication result parameter and a subscription permanent identifier (SUPI).

According to yet another aspect of the subject matter described herein, storing the subscription identifier and the indicator of the authentication result includes storing the SUPI and the value of the authentication result parameter.

According to yet another aspect of the subject matter described herein, using at least one of the subscription identifier extracted from the AMF location service message and contents of the AMF location service validation database identify the AMF location service message as a location tracking or DoS attack includes: extracting a SUPI from the AMF location service message; determining that a source PLMN of the AMF location service message matches a home PLMN of the SUPI extracted from the AMF location service message; performing a lookup in the AMF location service validation database using the SUPI; classifying the AMF location service message as a DoS attack in response to failing to locate a record corresponding to the SUPI in the AMF location service validation database or locating a record corresponding to the SUPI in the AMF location service validation database and determining that the record includes a value of an authentication result parameter that indicates that authentication of the UE was not successful.

According to yet another aspect of the subject matter described herein, using at least one of a subscription identifier from the AMF location service message and contents of the AMF location service validation database to classify the AMF location service message as a location tracking or DoS attack includes: extracting a subscription permanent identifier (SUPI) from the AMF location service message; identifying a home PLMN from the SUPI; determining a source PLMN of the AMF location service message; and classifying the AMF location service message as a location tracking attack in response to determining that the home PLMN identified from the SUPI does not match the source PLMN of the AMF location service message.

According to another aspect of the subject matter described herein, determining a source PLMN of the AMF location service message includes determining the source PLMN from a source address or a source transport layer security (TLS) certificate of the AMF location service message.

According to yet another aspect of the subject matter described herein, receiving an AMF location service message includes receiving an Namf_Location service message.

According to yet another aspect of the subject matter described herein, the Namf_Location service message includes one of a ProvidePositioningInfo, an EventNotify, and a ProvideLocationInfo service operation identifier.

According to yet another aspect of the subject matter described herein, a system for mitigating location tracking and DoS attacks that utilize an AMF location service is provided. The system includes a network function (NF) including at least one processor and a memory. The system further includes an AMF location service validation database embodied in the memory. The system further includes an authentication results collector implemented by the at least one processor for receiving an authentication response message from a home public land mobile network (HPLMN) of a user equipment (UE), extracting, from the authentication response message, a subscription identifier and an indicator of an authentication result for the UE, and storing, by the NF and in the AMF location service validation database, the subscription identifier and the indicator of the authentication result for the UE. The system further includes an AMF location service validator implemented by the at least one processor for receiving an AMF location service message, using at least one of a subscription identifier extracted from the AMF location service message and contents of the AMF location service validation database to classify the AMF location service message as a location tracking or DoS attack, and, in response to classifying the AMF location service message as a location tracking attack, preventing the location tracking or DoS attack.

According to yet another aspect of the subject matter described herein, in using at least one of the subscription identifier extracted from the AMF location service message and contents of the AMF location service validation database to identify the AMF location service message as a location tracking or DoS attack, the AMF location service validator is configured to: extract a SUPI from the AMF location service message; determine that a source PLMN of the AMF location service message matches a home PLMN of the SUPI extracted from the AMF location service message; perform a lookup in the AMF location service validation database using the SUPI; classify the AMF location service message as a DoS attack in response to failing to locate a record corresponding to the SUPI in the AMF location service validation database or locating a record corresponding to the SUPI in the AMF location service validation database and determining that the record includes a value of an authentication result parameter that indicates that authentication of the UE was not successful.

According to yet another aspect of the subject matter described herein, in using at least one of a subscription identifier from the AMF location service message and contents of the AMF location service validation database to classify the AMF location service message as a location tracking or DoS attack, the AMF location service validator is configured to: extract a subscription permanent identifier (SUPI) from the AMF location service message; identify a home PLMN from the SUPI extracted from the AMF location service message; determine a source PLMN of the AMF location service message; and classify the AMF location service message as a location tracking attack in response to determining that the home PLMN identified from the SUPI does not match the source PLMN of the AMF location service message.

According to another aspect of the subject matter described herein, the AMF location validator is configured to determine a source PLMN of the AMF location service message includes determining the source PLMN from a source address or a source transport layer security (TLS) certificate of the AMF location service message.

According to yet another aspect of the subject matter described herein, a non-transitory computer readable medium having stored thereon executable instructions that when executed by a processor of a computer control the computer to perform steps is provided. The steps include receiving, at a network function (NF), an authentication response message from a home public land mobile network (HPLMN) of a user equipment (UE). The steps further include extracting, by the NF and from the authentication response message, a subscription identifier and an indicator of an authentication result for the UE. The steps further include storing, by the NF and in an AMF location service validation database, the subscription identifier and the indicator of the authentication result for the UE. The steps further include receiving, by the NF, an AMF location service message. The steps further include using, by the NF, at least one of a subscription identifier extracted from the AMF location service message and contents of the AMF location service validation database, to classify the AMF location service message as a location tracking attack. The steps further include, in response to classifying the AMF location service message as a location tracking attack, preventing the location tracking attack.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
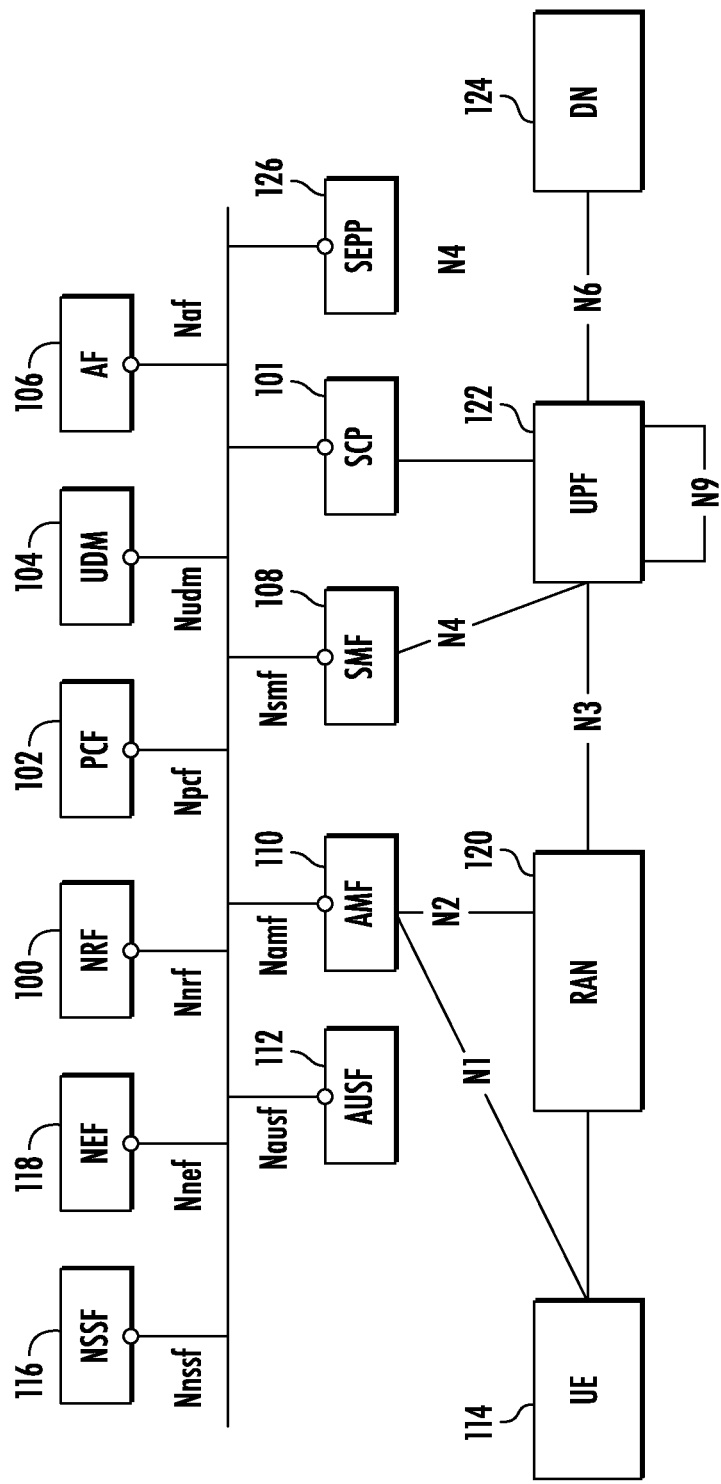
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that the Namf_Location service defined in 3GPP TS 29.518 does not require resource object level authorization before providing location information for a UE. Table 1 shown below illustrates the various types of messages that can be used in the in Namf_Location service to obtain location information regarding a UE or to institute a denial of service attack on an AMF.

TABLE 1

Namf_Location Service Operations

| Service Name | Service Operation | Operation Semantic | Known Consumer(s) |
|---|---|---|---|
| Namf_Location | ProvidePositioningInfo | Request/Response | GMLC |
| | EventNotify | Subscribe/Notify | GMLC |
| | ProvideLocationInfo | Request/Response | UDM |
| | CancelLocation | Request/Response | GMLC |

In Table 1, the Namf_Location service includes the ProvidePositioningInfo service operation, the EventNotify service operation, the ProvideLocationInfo service operation, and the CancelLocation service operation. The ProvidePositioningInfo info service operation is used by an NF service consumer, such as a gateway mobile location center (GMLC) to request the current or deferred geodetic an optionally civic location of a UE. This operation triggers the AMF to invoke service towards the location management function (LMF). The EventNotify service operation notifies the NF service consumer about UE location-related event information related to security sessions or deferred location, i.e., the initiation, handover, or termination of an emergency session or the completion or activation of deferred location. The ProvideLocationInfo service operation allows an NF service consumer, such as a UDM, to request the network provided location information (NPLI) of a target UE. The CancelLocation service operation is invoked by an NF service consumer, such as a GMLC, to cancel reporting periodic or event-triggered location.

Figure 2:
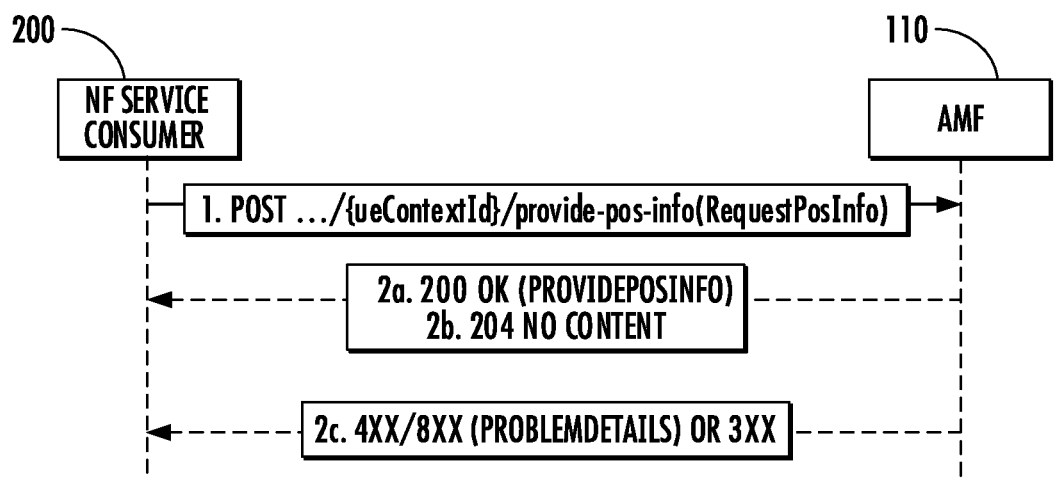
FIG. 2 is a message flow diagram illustrating exemplary messages exchanged for the Provide Positioning Info service operation of the Namf_Location service.

All of the services operations illustrated in Table 1 are triggered by either sending a request or a subscribe message to the AMF currently serving a UE. FIG. 2 illustrates an example of messages that are exchanged in the ProvidePositioningInfo service. Referring to FIG. 2, and NF service consumer 200 invokes the Provide Positioning Info service in line 1 by sending an HTTP Post message to AMF 110. The HTTP Post message includes the ProvidePositioningInfo URI, which identifies the ProvidePositioningInfo service operation. The HTTP Post message also includes an individual UE context. The individual UE context includes a UE context ID, which identifies the UE. In one example, the individual UE context may be composed or made of the UE's subscription permanent identifier (SUPI), which is a global identifier for the UE in the network.

In response to the post message containing the ProvidePositioningInfo service operation, AMF 110 may respond as indicated in step 2A where AMF 110 provides the requested UE positioning info, in step 2B where AMF 110 indicates no content is present for the UE, or as in step 2C, where AMF 110 indicates that there were problems in invoking the requested service operation.

It should be noted that there is no authentication of NF service consumer 200 as part of the Namf ProvidePositioningInfo service operation. Similar messages may be exchanged for the other Namf_Location service operations listed above in Table 1, none of which has a defined authentication mechanism.

Figure 3:
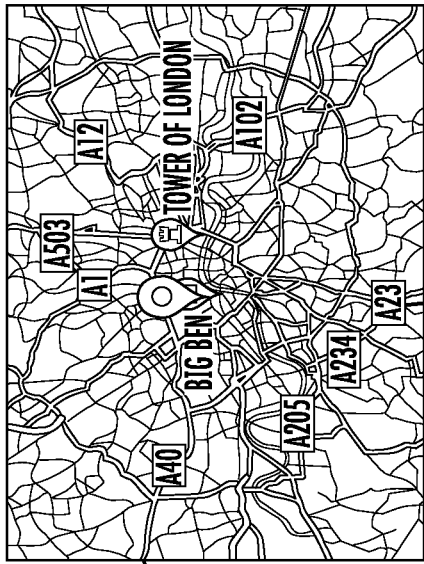
FIG. 3 is a diagram illustration exemplary UE geographic location information that can obtained using the ProvidePositioningInfo and the ProvideLocationInfo service operations of the Namf_Location service.

FIG. 3 illustrates an example of output from the ProvidePositioningInfo and ProvideLocationInfo service operations. As illustrated in FIG. 3, both service operations can output geographic position or coordinates of the UE. Both service operations can also output an age of location, which indicates the age or time that a particular UE location was reported. The output of the ProvidePositioningInfo service operation also includes a velocity estimate, which may suggest how fast a UE is moving. Because output of both of these service operations can be used to pinpoint the location of the UE and the time that a UE is at that particular location, it is desirable to prevent unauthorized access to this information. It is also desirable to prevent any of the message in Table 1 from being used to implement a DoS attack against an AMF.

Figure 4:
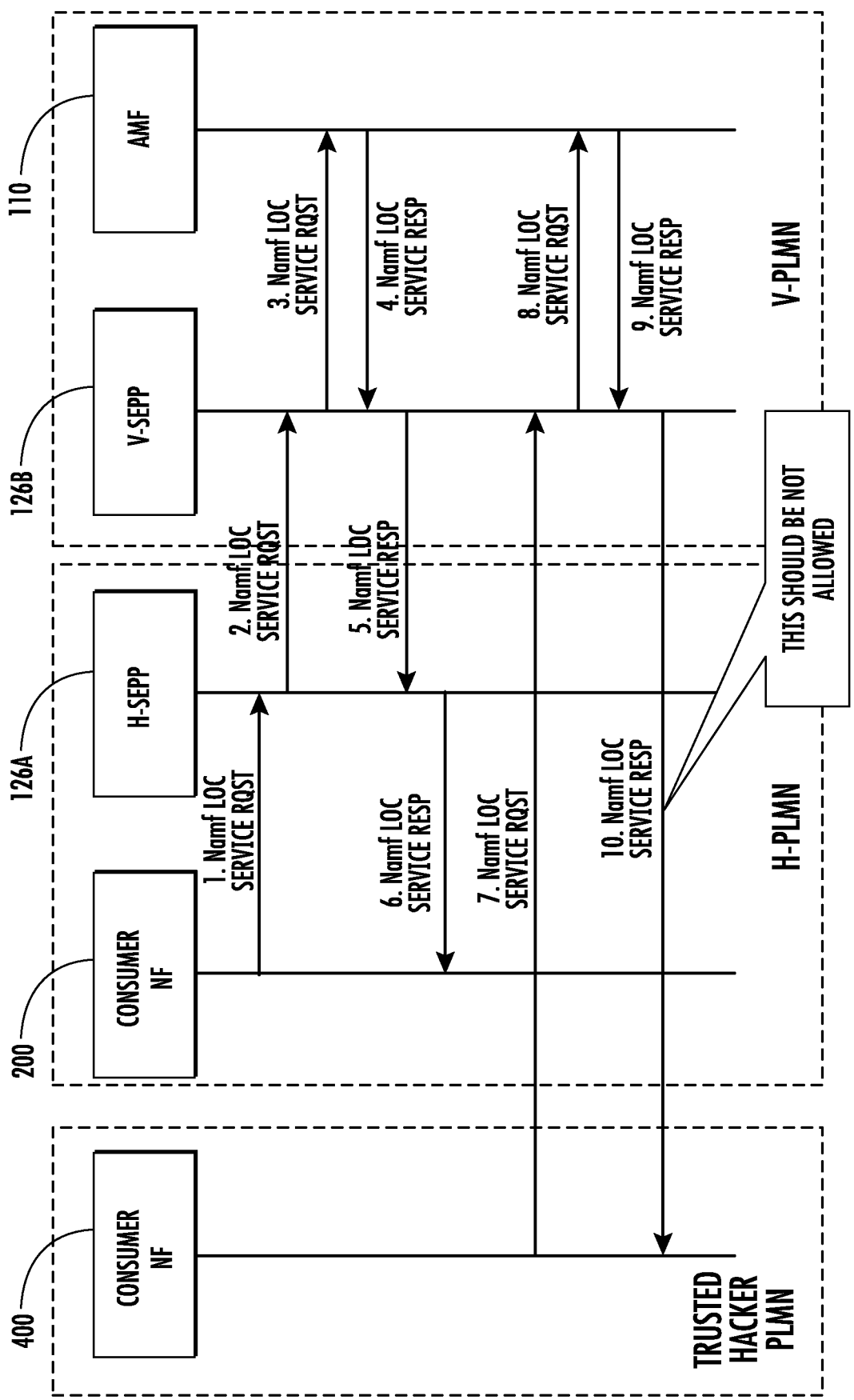
FIG. 4 is a message flow diagram illustrating exemplary messages exchanged for a legitimate access to the Namf_Location service and for a location tracking attack.

FIG. 4 is a message flow diagram illustrating exemplary messages exchanged for a legitimate access to the Namf_Location service and for a location tracking or DoS attack. Referring to FIG. 4, consumer NF 200 and home SEPP 126A are components of the home network of a UE. Visited SEPP 126B and AMF 110 are components of the visited network in which the UE is currently roaming. An attacker 400 is located outside of both the home and visited networks. However, the subject matter described herein also is capable of detecting location tracking attacks from within the home and visited networks of a UE.

In line 1 of the message flow illustrated in FIG. 4, consumer NF 200 sends an Namf_Location request message to H-SEPP 126A. In line 2, H-SEPP 126A forwards the Namf_Location service request to V-SE PP 126B located in the visited network. In line 3, V-SEPP 126B forwards the Namf_Location service request to AMF 110.

In line 4, AMF 110 sends an Namf_Location service response to V-SEPP 126B. The Namf_Location service response contains the requested location information of the UE. In line 5, V-SEPP 126B sends the Namf_Location service response to H-SEPP 126A. In line 6, H-SEPP 126A forwards the location service response to consumer NF 200, which is the node that requested the data.

Lines 1-6 illustrate the legitimate use of the Namf_Location service by consumer NF 200 located in the home network of the UE. However, in line 7, a consumer NF 400 controlled by an attacker and masquerading as a legitimate service user sends an Namf_Location service request message to V-SEPP 126B. In line 8, V-SEPP 126B forwards the Namf_Location service request to AMF 110. AMF 110 does not perform any authentication of the request and, in line 9, responds with the requested UE location data in an Namf_Location service response message.

In line 10, V-SEPP 126B forwards the Namf_Location service response to consumer NF 400. Because consumer NF 400 has access to location information regarding the subscriber, consumer NF 400 can report this location to a criminal, who can use the location information for nefarious purposes. In addition, consumer NF can initiate multiple unauthorized Namf_Location service request messages to AMF 110 to overwhelm the resources of AMF 110 in a DoS attack.

In order to mitigate or guard against location tracking attacks, such as that illustrated in FIG. 4, and DoS attacks that utilize the Namf location service, a network function, such as an SEPP, may store subscription identification information and authentication obtained from the UE authentication request from an AUSF and use the subscription identification and authentication result information to validate AMF location service messages concerning the UE.

Figure 5:
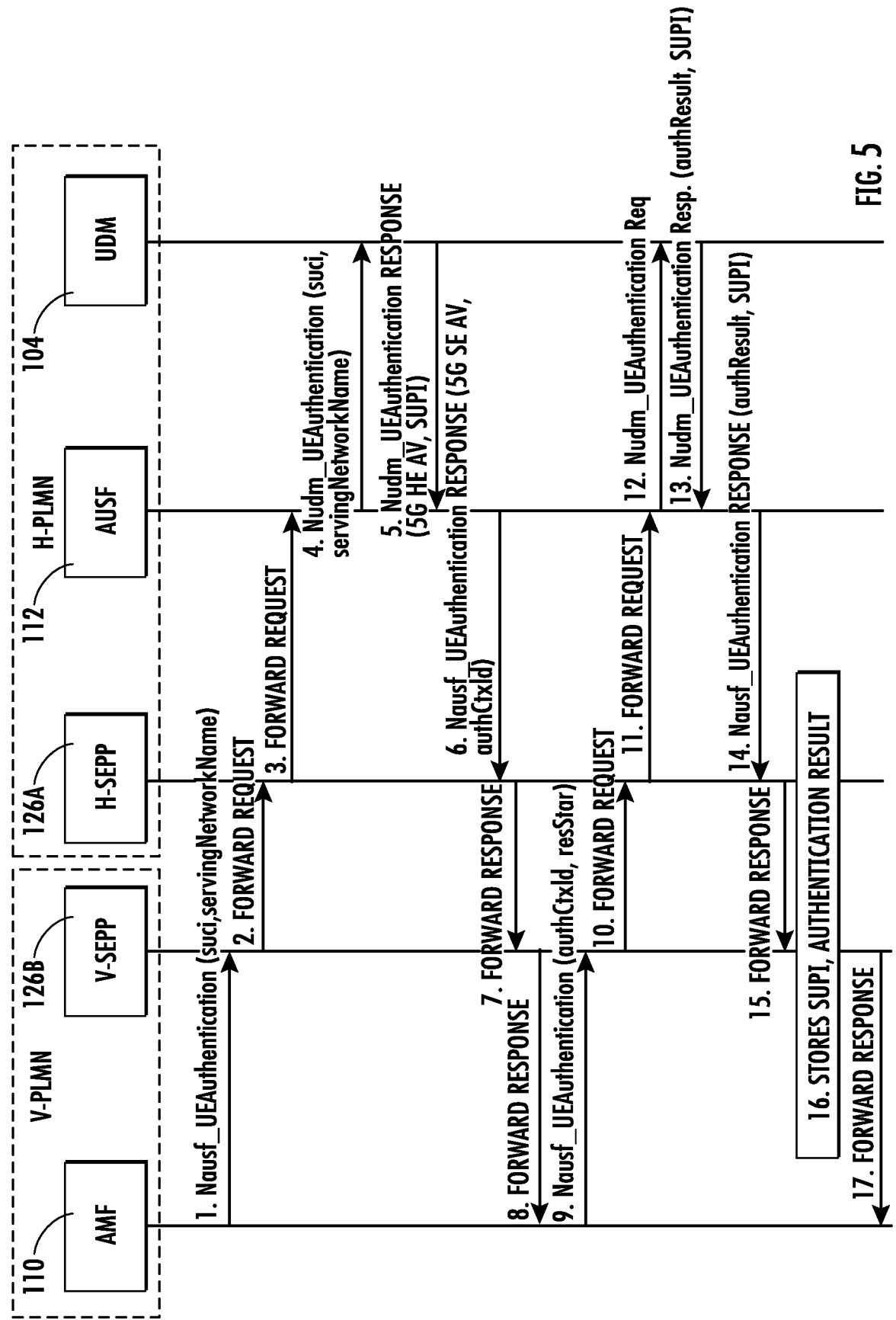
FIG. 5 is a message flow diagram illustrating exemplary messages exchanged and steps performed by a visited SEPP in obtaining and storing UE subscription identification information and authentication result information from the Nausf authentication procedure.

FIG. 5 is a message flow diagram illustrating exemplary messages exchanged and steps performed by a visited SEPP in obtaining and storing UE subscription identification information and authentication result information from the Nausf authentication procedure. Referring to FIG. 5, when a UE registers with an AMF, the AMF sends an Nausf_UEAuthentication_Authenticate request message to the home network of the UE, as indicated by line 1 of the message flow diagram. The Nausf_UEAuthentication_Authenticate request message includes the subscription concealed identifier (SUCI) and an identifier for the serving network in which the UE is currently located. In line 2 of the message flow diagram, V-SEPP 126B forwards the in a Nausf_UEAuthentication_Authenticate request message to H-SEPP 126A. In line 3 of the message flow diagram, H-SEPP 126A forwards the Nausf_UEAuthentication message to AUSF 112.

In line 4 of the message flow diagram, AUSF 112 receives the Nausf_UEAuthentication_Authenticate request, determines whether the requesting AMF in the serving network is entitled to use the serving network name in the Nausf_UEAuthentication_Authenticate request, and sends an Nudm_UEAuthentication_Get request message to UDM 104. The Nudm_UEAuthentication_Get request message contains the SUCI and the serving network name.

Upon receiving the Nudm_UEAuthentication_Get request, UDM 104 de-conceals the SUCI to determine the SUPI. Based on the SUPI, UDM 104 selects an authentication method. In line 5 of the message flow diagram, UDM 104 sends an Nudm_UEAuthentication_Get response message to AUSF 112. The Nudm_UEAuthentication_Get response message contains an authentication vector (AV) containing authentication challenge information according to the selected authentication method. The Nudm_UEAuthentication_Get response message also includes the SUPI. In line 6 of the message flow diagram, AUSF 112 generates and sends an Nausf_UEAuthentication_Authenticate response message containing the authentication vector and an authentication context ID to H-SEPP 126A. In line 7 of the message flow diagram, H-SEPP 126A forwards the Nausf_UEAuthentication_Authenticate response to V-SEPP 126B. In line 8, V-SEPP 126B forwards the Nausf_UEAuthentication_Authenticate response to AMF 110.

AMF 110 receives the Nausf_UEAuthentication_Authenticate response message including the authentication vector and sends an authentication request message to the UE with the authentication vector including the authentication challenge information. The UE calculates an authentication response based on the authentication challenge information. In one type of authentication, the authentication response is a Res* value computed by the UE using a secure hash algorithm. The UE communicates the Res* value to AMF 110 in an authentication response message. In line 9, AMF 110 forwards the Res* value to V-SEPP 126B in an Nausf_UEAuthentication_Authenticate request message. In line 10, V-SEPP 126B forwards the Nausf_UEAuthentication_Authenticate request message to H-SEPP 126A. In line 11, H-SEPP 126A forwards the Nausf_UEAuthentication_Authenticate request to AUSF 112. In line 12, AUSF 112 formulates and sends an Nudm_UEAuthentication request message UDM 104. In line 13, UDM 104 authenticates the UE based on the Res* value and responds to the Nudm_UEAuthentication request message by sending an Nudm_UEAuthentication response message containing an authentication result parameter and the SUPI of the UE. The value of the authentication result parameter indicates whether the authentication of the UE was successful or not. In line 14, AUSF 112 responds to the Nudm_UEAuthentication response by generating and sending an Nausf_UEAuthentication response including the authentication result and the SUPI to H-SEPP 126A. In line 15, H-SEPP 126A forwards the Nausf_UEAuthentication response to V-SEPP 126B.

Rather than simply forwarding the Nausf_UEAuthentication response message to AMF 110, V-SEPP 126B extracts the value of the authentication result parameter and the SUPI from the Nausf_UEAuthentication response and stores the SUPI and the value of the authentication result parameter in an AMF location service validation database. In line 17, V-SEPP 126B forwards the Nausf_UEAuthentication response message to AMF 110.

Figure 6:
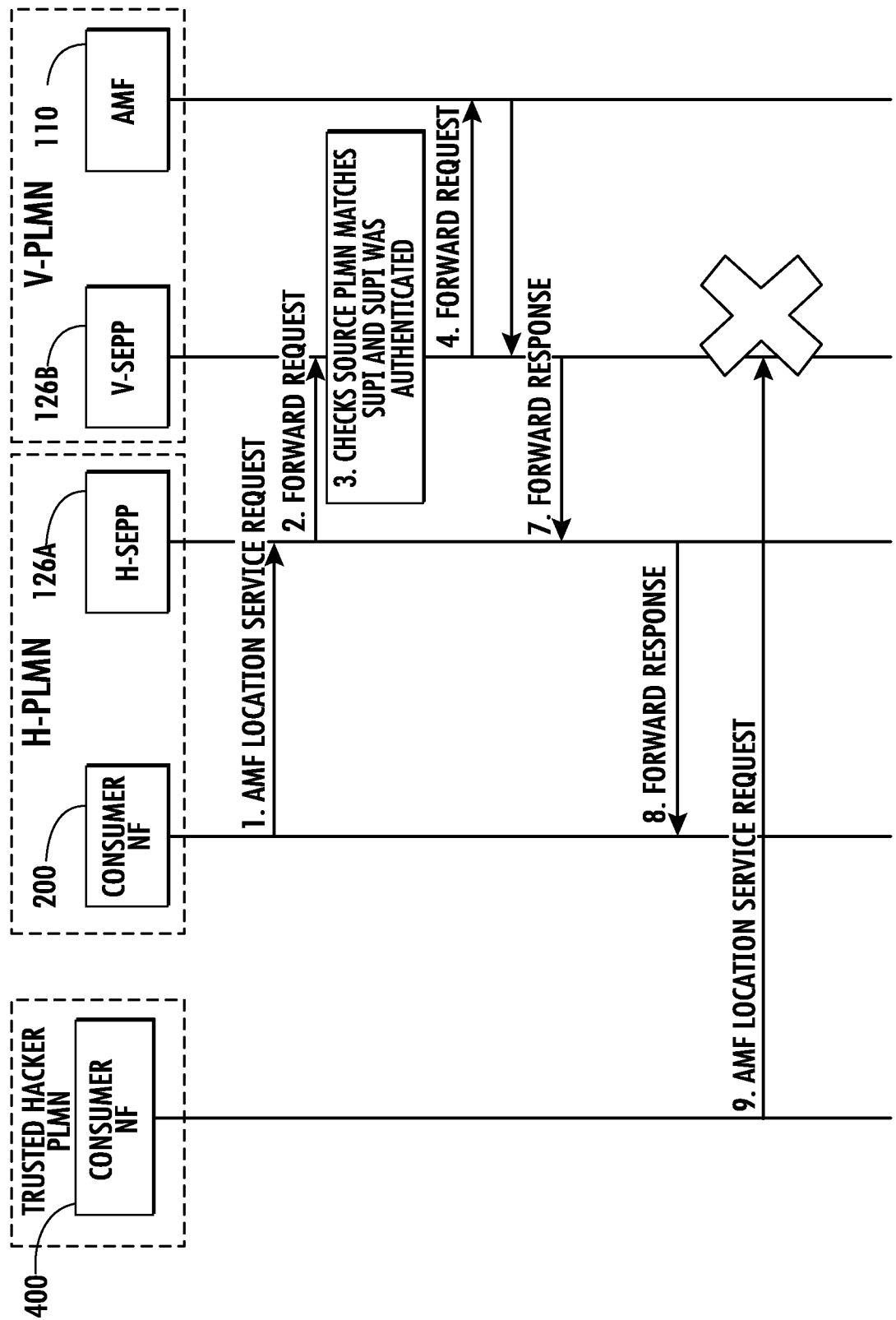
FIG. 6 is a message flow diagram illustrating the use of stored UE subscription identification and authentication result information to validate AMF location service request messages and to prevent location tracking attacks and DoS attacks that utilize an AMF location service.

Once V-SEPP 126B stores the SUPI and the authentication result, this data can be used to validate future AMF location service request and subscribe messages. FIG. 6 is a message flow diagram illustrating the use of stored UE subscription identification and authentication result information to validate AMF location service messages and to prevent a location tracking attack or a DoS attack that utilizes AMF location service messages. Referring to FIG. 6, in line 1, a consumer NF 200 located in the home PLMN sends an AMF location service request message to H-SEPP 126A. In line 2, H-SEPP 126A forwards the AMF location service request to V-SEPP 126B. Rather than simply forwarding the AMF location service request message to AMF 110, in step 3, V-SEPP 126B checks the source PLMN in the AMF location service request against the SUPI and checks the authentication result stored for the SUPI to determine whether the UE was authenticated. Table 2 shown below Illustrates an example of the UE content text identification information that may be included in the AMF location service request message.

TABLE 2

UE Context ID Information Contained in Location Service Request

| Name | Data type | Definition |
| --- | --- | --- |
| apiRoot | string | See clause 6.4.1 |
| apiVersion | string | See clause 6.4.1. |
| ueContextId | string | Represents the Subscription Permanent Identifier (see 3GPP TS 23.501 [2] clause 5.9.2) pattern: see pattern of type Supi in 3GPP TS 29.571 [6] Or represents the Permanent Equipment Identifier (see 3GPP TS 23.501 [2] clause 5.9.3) pattern: "(imei-[0-9]{15}\|imeisv-[0-9]{16}\|.+)" |

Table 2 is a copy of Table 6.4.3.2.2-1 of 3GPP TS 29.518, which specifies the resource URI variables for the UE context ID that is carried in the location service request message. As indicated in Table 2, the UE context ID includes either the SUPI or a permanent equipment identifier. The pattern for the SUPI is defined in 3GPP TS 23.501. In this example, it is assumed that the SUPI is present in the AMF location service request message. Clause 5.9.2 of 3GPP TS 23.501 states the following regarding the SUPI:

A globally unique 5G Subscription Permanent Identifier (SUPI) shall be allocated to each subscriber in the 5G System and provisioned in the UDM/UDR. The SUPI is used only inside 3GPP system, and its privacy is specified in TS 33.501 [29]. The SUPI may contain:
  an IMSI as defined in TS 23.003 [19], or
  a network-specific identifier, used for private networks as defined in TS 22.261 [2].
  a GLI and an operator identifier of the 5GC operator, used for supporting FN-BRGs, as further described in TS 23.316 [84].
  a GCI and an operator identifier of the 5GC operator, used for supporting FN-CRGs and 5G-CRG, as further described in TS 23.316 [84].

A SUPI containing a network-specific identifier shall take the form of a Network Access Identifier (NAI) using the NAI RFC 7542 [20] based user identification as defined in TS 23.003 [19].

When UE needs to indicate its SUPI to the network (e.g. as part of the Registration procedure), the UE provides the SUPI in concealed form as defined in TS 23.003 [19].

In order to enable roaming scenarios, the SUPI shall contain the address of the home network (e.g. the MCC and MNC in the case of an IMSI based SUPI).

For interworking with the EPC, the SUPI allocated to the 3GPP UE shall always be based on an IMSI to enable the UE to present an IMSI to the EPC.

As indicated above in the passages from 3GPP TS 23.501, the SUPI may contain a globally unique identifier for the UE and may also contain the address of the home network or HPLMN. Thus, the validation of the AMF location service request message in step 3 of FIG. 6 may be performed as follows:

1. Extract the SUPI from the AMF location service message.
2. Determine whether the source PLMN of the AMF location service message matches the home PLMN specified in the SUPI of the AMF location service message. As indicated in the excerpt above from 3GPP TS 23.501, the SUPI contains the address of the home network, which can be in the form of a mobile network code (MNC) and a mobile country code (MCC). These parameters can be compared with the MNC and MCC of the source PLMN of the AMF location service message. The source PLMN of the AMF location service message can be identified from a source TLS certificate or a source address of the message (e.g., source IP address or source domain). The AMF location service validation database may include a table that maps source IP addresses or domains to MNCs and MCCs of known networks. Thus, the source address extracted from the message may be used to identify the MNC and MCC of the source network, and these parameters may be compared with the MNC and MCC extracted from the SUPI. If the source PLMN from the TLS certificate is used, the source PLMN from the TLS certificate obtained from the AMF location service message may be compared with the MNC, MCC, or other home-network-identifying parameter contained in or derived from the SUPI.
3. If the source PLMN in the AMF location service message does not match the home PLMN in the SUPI of the AMF location service message, validation fails.
4. If the source PLMN in the AMF location service message matches the home PLMN in the SUPI of the AMF location service message, perform a lookup for the SUPI in the AMF location service validation database.
5. If the SUPI from the AMF location service message is not present in the AMF location service validation database, validation fails.
6. If the SUPI from the AMF location service message is present in the AMF location service validation database, check the authentication result in the matching database record.
7. If the authentication result in the database record indicates that the UE was not authenticated, validation fails.
8. If the authentication result in the database record indicates that the UE was authenticated, validation passes.

Table 3 shown below illustrates an exemplary record that may be present in the AMF location service validation database after the storage of the authentication result and SUPI information obtained from the Nausf authentication procedure illustrated in FIG. 5.

TABLE 3

Example AMF Location Service Validation Database Record

| SUPI | AUTHENTICATION RESULT |
|---|---|
| SUPI1 | AUTHENTICATED |

In Table 3, the database record includes SUPI1, which was obtained from the UDM in the HPLMN of the subscriber using the procedure of FIG. 5. The authentication result of AUTHENTICATED indicates that the authentication of the UE was successful.

Continuing with the message flow in FIG. 6, in the example in step 3, the AMF location service request is validated using the steps described above. Accordingly, in line 4, V-SEPP 126B forwards the AMF location service request to AMF 110. In line 5, AMF 110 generates and sends an AMF location service response message including the requested UE location information to V-SEPP 126B. In line 6, V-SEPP 126B forwards the AMF location service response to H-SEPP 126A. In line 7, H-SEPP 126A forwards the AMF location service response to consumer NF 200.

In line 8 of the message flow illustrated in FIG. 6, consumer NF 400, which in this example is a hacker or an attacker, sends an AMF location service request to V-SEPP 126B, which is the SEPP for the visited network where the UE is currently roaming. V-SEPP 126B classifies the AMF location service request as being a location tracking or DoS attack using the steps described above. To reiterate, the AMF location service request may be classified as a location tracking attack if the source PLMN of the message does not match the home PLMN in the SUPI, the SUPI is not present in the AMF location service validation database, or as a DoS attack if the SUPI is present in the AMF location service validation database and the authentication result stored for the SUPI indicates that the UE has not been successfully authenticated. In this case, V-SEPP 126B prevents the AMF location service request from being forwarded to AMF 110 and may discard the location service request and optionally generate a record of the location service request for delivery to the network operator. Thus, using the steps in FIG. 6, a SUPI and authentication result stored during an Namf authentication procedure triggered by registration of a UE at an AMF is used to validate an AMF location service request (in step 3) and to reject an AMF location service request from an attacker (in line 8).

Figure 7:
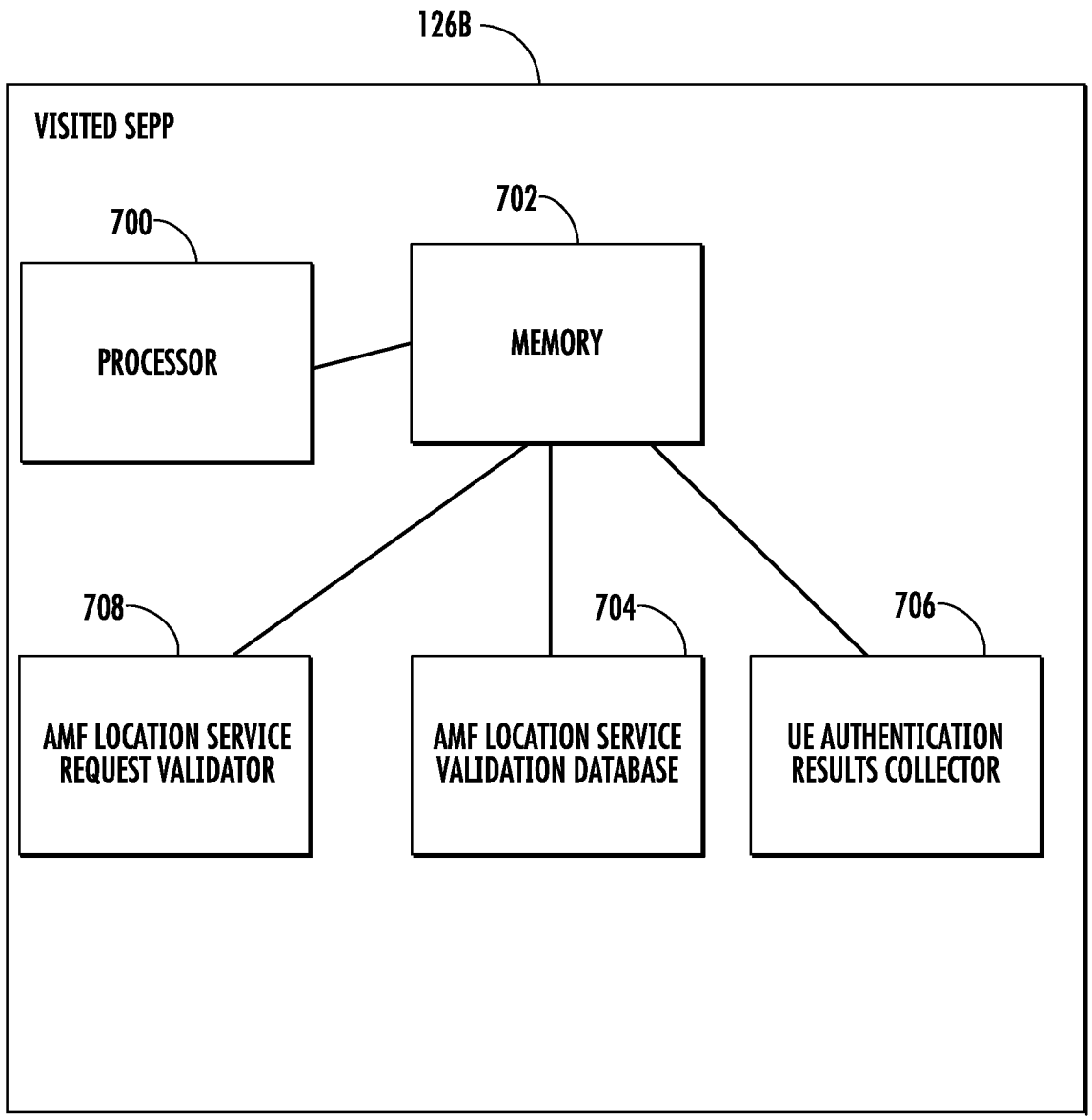
FIG. 7 is a block diagram illustrating an exemplary architecture for an SEPP capable of validating AMF location service messages using the methodology described herein.

FIG. 7 is a block diagram illustrating an exemplary architecture for an SEPP capable of validating AMF location service request messages using the methodology described herein. Referring to FIG. 7, an SEPP that implements the subject matter described herein may be a visited SEPP of the UE whose location or positioning information is being protected. In the examples described above, AMF location service validation is performed by V-SEPP 126B for a roaming subscriber that is registered with an AMF in a VPLMN.

In the example architecture illustrated in FIG. 7, SEPP 126B includes at least one processor 700 and a memory 702. SEPP 126B includes an AMF location service validation database 704 that stores SUPIs and authentication result information obtained from the Nausf authentication procedure described above. Home or visited SEPP 126B further includes a UE authentication results collector 706 for performing the steps described above with regard to FIG. 5 for obtaining UE authentication information and SUPI information and storing the information in database 704. SEPP 126A further includes an AMF location service validator 708 for validating or rejecting AMF location service messages using the SUPI and authentication result information stored in database 704. In one exemplary implementation, UE authentication results collector 706 and AMF location service validator 708 may be implemented using computer executable instructions embodied in memory 702 and executable by processor 700.

Figure 8:
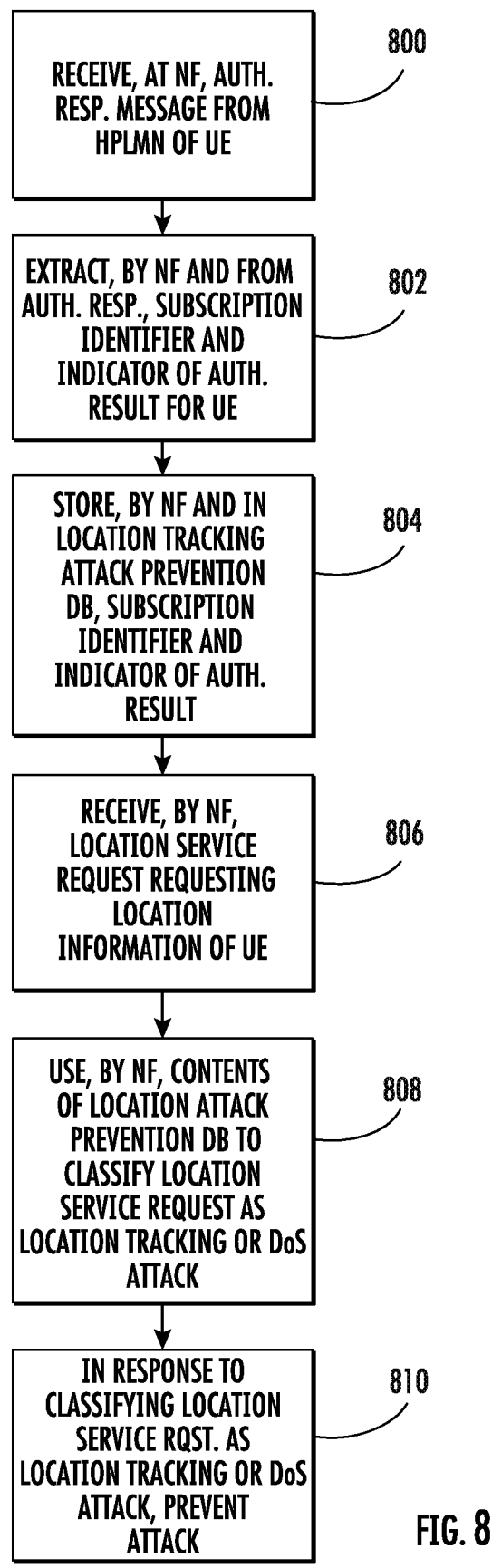
FIG. 8 is a flow chart illustrating an exemplary process for mitigating location tracking attacks and DoS attacks that utilize an AMF location service.

FIG. 8 is a flow chart illustrating an exemplary process for mitigating location tracking and DoS attacks. Referring to FIG. 8, in step 800, the process includes receiving, at a network function, an authentication response message from a home public land mobile network of a UE. For example, an SEPP, such as visited SEPP 126B may receive an Nausf_UEAuthentication response message, as indicated by line 14 in FIG. 5.

In step 802, the process includes extracting, by the NF and from the authentication response message, a subscription identifier and an indicator of an authentication result for the UE. For example, visited SEPP 126B may extract the SUPI and the value of an authentication result parameter from the Nausf_UEAuthentication response message.

In step 804, the process includes storing, by the NF and in an AMF location service validation database, the subscription identifier and the authentication result. For example, visited SEPP 126B may store the SUPI and the value of the authentication result parameter extracted from the Nausf_UEAuthentication response message in the AMF location service validation database.

In step 806, the process includes receiving, by the NF, an AMF location service message. For example, visited SEPP 126B may receive an AMF location service message, where the AMF location service message is any of the message types illustrated in Table 1 that request or subscribe to receive location or position information regarding a UE. Examples of such messages may include messages carrying the ProvidePositioningInfo service operation identifier, the ProvideLocationInfo service operation identifier, or the EventNotify service operation identifier.

In step 808, the process includes using at least one of: the subscription identifier from the AMF location service message and contents of the AMF location service validation database to classify the AMF location service message as a location tracking or DoS attack. For example, visited SEPP 126B may determine that the source PLMN of the message does not match the home PLMN in the SUPI extracted from the message to identify the message as a location tracking attack. If the source PLMN of the message matches the home PLMN included in the SUPI, the SEPP may perform a lookup in the AMF location service validation database using the SUPI extracted from the AMF location service message. If the SUPI is not present in the database or if the authentication result obtained from the database does not indicate that the UE was authenticated, the AMF location service message may be classified as a DoS attack.

In step 810, the process includes, in response to classifying the AMF location service message as a location tracking or DoS attack, preventing the location tracking or DoS attack. For example, visited SEPP 126B, in response to classifying the AMF location service message as being a location tracking or DoS attack, may prevent the attack by discarding the message. Visited SEPP 126B may also store the message and send a message to the network operator identifying the message as being associated with a location tracking attack or DoS.

Advantages of the subject matter described herein include mitigating or reducing successful location tracking attacks where the location of a UE can be obtained without authorization. The subject matter described herein also mitigates or reduces successful denial of service attacks at the AMF because unauthorized AMF location service messages identified as being associated with a location tracking or DoS attack will be stopped at the SEPP and prevented from being forwarded to the AMF. The subject matter described herein can be implemented at any NF that processes or forwards AMF location service messages, including a visited SEPP of the UE and the AMF at which the UE is registered. The subject matter described herein may also be extended to validate other types of inter-PLMN messaging towards the visited SEPP.

The disclosure of each of the following references is hereby incorporated herein by reference in its entirety.

REFERENCES 1. 3GPP TS 33.501 V17.0.0 (2020 December) $3^{rd}$ Generation Partnership Project; Technical Specification Group Services and System Aspects; Security Architectures and Procedures for 5G System (Release 17).
2. 3GPP TS 29.573 V16.5.0 (2020 December) $3^{rd}$ Generation Partnership Project; Technical Specification Group Core Network and Terminals; 5G System; Public Land Mobile Network (PLMN) Interconnection; Stage 3 (Release 16).
3. 3GPP TS 29.572 V16.5.0 (2020 December) $3^{rd}$ Generation Partnership Project Technical Specification Group Core Network and Terminals; 5G System; Location Management Services; Stage 3 (Release 16).
4. 3GPP TS 29.518 V17.0.0 (2020 December) $3^{rd}$ Generation Partnership Project; Technical Specification Group Core Network and Terminals; 5G System; Access and Mobility Management Services; Stage 3 (Release 17).
5. 3GPP TS 23.502 V16.7.1 (2021 January), $3^{rd}$ Generation Partnership Project; Technical Specification Group Services and System Aspects; Procedures for the 5G System (5GS); Stage 2 (Release 16).
6. 3GPP TS 23.501 V16.7.0 (2020 December), $3^{rd}$ Generation Partnership Project; Technical Specification Group Services and System Aspects; System Architecture for the 5G System (5GS), Stage 2 (Release 16).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating location tracking attacks and denial of service (DoS) attacks that utilize an access and mobility management function (AMF) location service, the method comprising:
   receiving, at a network function (NF), an authentication response message from a home public land mobile network (HPLMN) of a user equipment (UE), wherein the NF comprises a visited security edge protection proxy (SEPP) of the UE;
   extracting, by the NF and from the authentication response message, a subscription identifier and an indicator of an authentication result for the UE;

storing, by the NF and in an AMF location service validation database, the subscription identifier and the indicator of the authentication result for the UE;

receiving, by the NF, an AMF location service message;

using, by the NF, at least one of a subscription identifier extracted from the AMF location service message and contents of the AMF location service validation database, to classify the AMF location service message as a location tracking or DoS attack; and in response to classifying the AMF location service message as a location tracking or DoS attack, preventing the location tracking or DoS attack.

2. The method of claim 1 wherein receiving an authentication response message comprises receiving an Nausf_UEAuthentication message containing an authentication result parameter and a subscription permanent identifier (SUPI).

3. The method of claim 2 wherein storing the subscription identifier and the indicator of the authentication result includes storing the SUPI and a value of the authentication result parameter.

4. The method of claim 3 wherein using at least one of the subscription identifier extracted from the AMF location service message and contents of the AMF location service validation database to identify the AMF location service message as a location tracking or DoS attack comprises:
   extracting a SUPI from the AMF location service message;
   determining that a source PLMN of the AMF location service message matches a home PLMN of the SUPI extracted from the AMF location service message;
   performing a lookup in the AMF location service validation database using the SUPI; and
   classifying the AMF location service message as a DoS attack in response to failing to locate a record corresponding to the SUPI in the AMF location service validation database or locating a record corresponding to the SUPI in the AMF location service validation database and determining that the record includes a value of an authentication result parameter that indicates that authentication of the UE was not successful.

5. The method of claim 1 wherein using at least one of a subscription identifier from the AMF location service message and contents of the AMF location service validation database to classify the AMF location service message as a location tracking or DoS attack includes:
   extracting a subscription permanent identifier (SUPI) from the AMF location service message;
   identifying a home PLMN from the SUPI;
   determining a source PLMN of the AMF location service message; and
   classifying the AMF location service message as a location tracking attack in response to determining that the home PLMN identified from the SUPI does not match the source PLMN of the AMF location service message.

6. The method of claim 5 wherein determining a source PLMN of the AMF location service message includes determining the source PLMN from a source address or a source transport layer security (TLS) certificate of the AMF location service message.

7. The method of claim 1 wherein receiving an AMF location service message includes receiving an Namf_Location service message.

8. The method of claim 7 wherein the Namf_Location service message includes one of a ProvidePositioningInfo, an EventNotify, and a Provide Location Info service operation identifier.

9. A system for mitigating location tracking and DoS attacks that utilize an access and mobility management function (AMF) location service, the system comprising:
   a network function (NF) including at least one processor and a memory, wherein the NF comprises a visited security edge protection proxy (SEPP) of the UE;
   an AMF location service validation database embodied in the memory;
   an authentication results collector implemented by the at least one processor for receiving an authentication response message from a home public land mobile network (HPLMN) of a user equipment (UE), extracting, from the authentication response message, a subscription identifier and an indicator of an authentication result for the UE, and storing, by the NF and in the AMF location service validation database, the subscription identifier and the indicator of the authentication result for the UE; and
   an AMF location service validator implemented by the at least one processor for receiving an AMF location service message, using at least one of a subscription identifier extracted from the AMF location service message and contents of the AMF location service validation database to classify the AMF location service message as a location tracking or DoS attack, and, in response to classifying the AMF location service message as a location tracking or DoS attack, preventing the location tracking attack.

10. The system of claim 9 the authentication response message comprises an Nausf_UEAuthentication message containing an authentication result parameter and a subscription permanent identifier (SUPI).

11. The system of claim 10 wherein storing the subscription identifier comprises the SUPI and the indicator of the authentication result includes a value of the authentication result parameter.

12. The system of claim 11 wherein, in using at least one of the subscription identifier extracted from the AMF location service message and contents of the AMF location service validation database to identify the AMF location service message as a location tracking or DoS attack, the AMF location service validator is configured to:
   extract a SUPI from the AMF location service message;
   determine that a source PLMN of the AMF location service message matches a home PLMN of the SUPI extracted from the AMF location service message;
   perform a lookup in the AMF location service validation database using the SUPI; and
   classify the AMF location service message as a DoS attack in response to failing to locate a record corresponding to the SUPI in the AMF location service validation database or locating a record corresponding to the SUPI in the AMF location service validation database and determining that the record includes a value of an authentication result parameter that indicates that authentication of the UE was not successful.

13. The system of claim 9 wherein, in using at least one of a subscription identifier from the AMF location service message and contents of the AMF location service validation database to classify the AMF location service message as a location tracking or DoS attack, the AMF location service validator is configured to:
   extract a subscription permanent identifier (SUPI) from the AMF location service message;

identify a home PLMN from the SUPI extracted from the AMF location service message;

determine a source PLMN of the AMF location service message; and classify the AMF location service message as a location tracking attack in response to determining that the home PLMN identified from the SUPI does not match the source PLMN of the AMF location service message.

14. The system of claim 13 wherein the AMF location service validator is configured to determine a source PLMN of the AMF location service message by determining the source PLMN from a source address or a source transport layer security (TLS) certificate of the AMF location service message.

15. The system of claim 9 wherein the AMF location service message comprises an Namf_Location service message including one of a ProvidePositioningInfo, an EventNotify, and a ProvideLocationInfo service operation identifier.

16. A non-transitory computer readable medium having stored thereon executable instructions that when executed by a processor of a computer control the computer to perform steps comprising:

receiving, at a network function (NF), an authentication response message from a home public land mobile network (HPLMN) of a user equipment (UE), wherein the NF comprises a visited security edge protection proxy (SEPP) of the UE;

extracting, by the NF and from the authentication response message, a subscription identifier and an indicator of an authentication result for the UE;

storing, by the NF and in an access and mobility management function (AMF) location service validation database, the subscription identifier and the indicator of the authentication result for the UE;

receiving, by the NF, an AMF location service message;

using, by the NF, at least one of a subscription identifier extracted from the AMF location service message and contents of the AMF location service validation database, to classify the AMF location service message as a location tracking or denial of service (DoS) attack; and in response to classifying the AMF location service message as a location tracking or DoS attack, preventing the location tracking or DoS attack.

* * * * *